(12) United States Patent
Salminen et al.

(10) Patent No.: US 9,953,319 B2
(45) Date of Patent: Apr. 24, 2018

(54) PAYMENT SYSTEM

(71) Applicant: Unito Oy, Helsinki (FI)

(72) Inventors: Simo Salminen, Helsinki (FI); Tuomo Kajava, Mijas Costa (ES)

(73) Assignee: Unito Oy, Helsinki (FI)

( * ) Notice: Subject to any disclaimer, the term of this patent is extended or adjusted under 35 U.S.C. 154(b) by 0 days.

(21) Appl. No.: 14/347,805

(22) PCT Filed: Sep. 28, 2012

(86) PCT No.: PCT/FI2012/000038
§ 371 (c)(1),
(2) Date: Mar. 27, 2014

(87) PCT Pub. No.: WO2013/045743
PCT Pub. Date: Apr. 4, 2013

(65) Prior Publication Data
US 2014/0236842 A1  Aug. 21, 2014

Related U.S. Application Data

(60) Provisional application No. 61/631,040, filed on Dec. 27, 2011.

(30) Foreign Application Priority Data

Sep. 28, 2011 (FI) ........................... 20115945
Dec. 15, 2011 (FI) ........................... 20116274

(51) Int. Cl.
G06Q 20/40 (2012.01)
G06Q 20/20 (2012.01)
(Continued)

(52) U.S. Cl.
CPC ........... *G06Q 20/401* (2013.01); *G06Q 20/20* (2013.01); *G06Q 20/204* (2013.01);
(Continued)

(58) Field of Classification Search
None
See application file for complete search history.

(56) References Cited

U.S. PATENT DOCUMENTS 6,327,578 B1 * 12/2001 Linehan ........................ 705/65
6,980,830 B2   12/2005 Ahonen
(Continued)

FOREIGN PATENT DOCUMENTS

EP   0936530 A1 *  8/1999 ............... G06F 1/00
EP   0936530 A1    8/1999
(Continued)

OTHER PUBLICATIONS

Ekberg, J.-E., et al., "On-board credentials with open provisioning," ASIACCS'09, Mar. 10-12, 2009, Sydney, NSW, Australia. pp. 104-115.
(Continued)

*Primary Examiner* — John W Hayes
*Assistant Examiner* — Jason B Fenstermacher
(74) *Attorney, Agent, or Firm* — Ziegler IP Law Group, LLC

(57) ABSTRACT

A method of making a payment in which payment data is received by a user's terminal from a point-of-sale terminal, a secret of a payment application is received by the terminal from the operator's server system, a trust card is activated in the user's terminal by utilizing said secret of the payment application, and data of the trust card is transmitted from the user's terminal to the point-of-sale terminal for making the payment transaction. A trust card is created in the server system, data of the trust card is transmitted to the terminal to be used for making the payment transaction, the secret of the payment application is formed in the server system, and (Continued)

Figure 1:
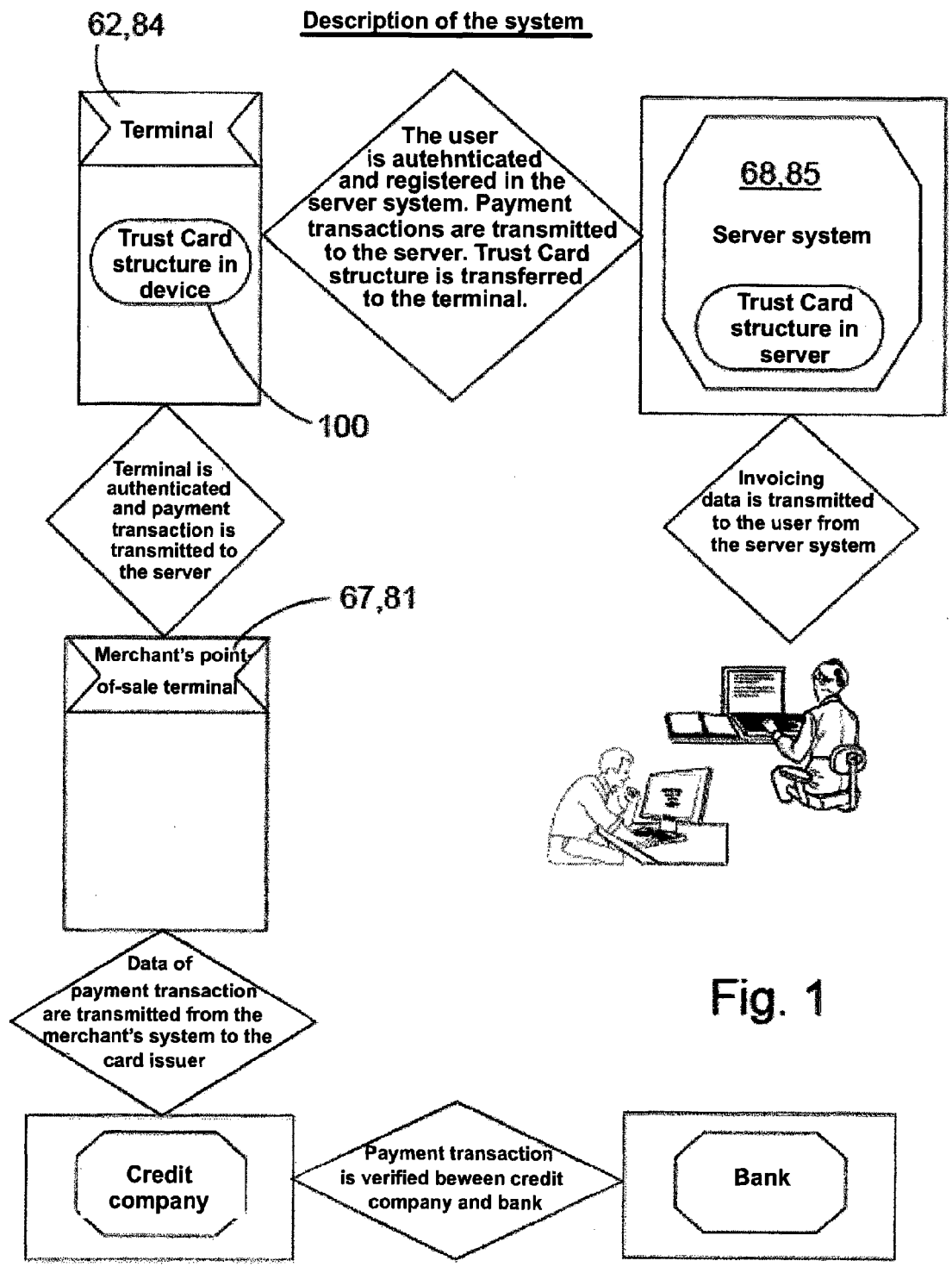

access to the secret of the payment application is provided to the terminal for activating the trust card for making the payment transaction.

17 Claims, 7 Drawing Sheets

(51) Int. Cl.
*G06Q 20/34* (2012.01)
*G06Q 20/38* (2012.01)

(52) U.S. Cl.
CPC ......... *G06Q 20/206* (2013.01); *G06Q 20/354* (2013.01); *G06Q 20/3825* (2013.01); *G06Q 20/3827* (2013.01)

(56) References Cited

U.S. PATENT DOCUMENTS

| | | | | |
|---|---|---|---|---|
| 7,472,827 | B2* | 1/2009 | Fletcher | 235/380 |
| 9,082,119 | B2 | 7/2015 | Ortiz et al. | |
| 2007/0297610 | A1* | 12/2007 | Chen et al. | 380/270 |
| 2008/0270302 | A1* | 10/2008 | Beenau et al. | 705/42 |
| 2009/0031408 | A1* | 1/2009 | Thom et al. | 726/9 |
| 2009/0063312 | A1* | 3/2009 | Hurst | 705/30 |
| 2009/0068982 | A1 | 3/2009 | Chen et al. | |
| 2009/0288012 | A1 | 11/2009 | Hertel et al. | |
| 2009/0307142 | A1* | 12/2009 | Mardikar | 705/72 |
| 2010/0057619 | A1* | 3/2010 | Weller et al. | 705/67 |
| 2011/0258121 | A1 | 10/2011 | Kauniskangas et al. | |
| 2012/0041882 | A1 | 2/2012 | Vermeulen et al. | |
| 2013/0035970 | A1* | 2/2013 | Fisher | G06Q 20/32 705/5 |

FOREIGN PATENT DOCUMENTS

| | | | |
|---|---|---|---|
| EP | 0959436 A1 | 11/1999 | |
| EP | 2365469 A1 | 9/2011 | |
| FI | 104937 A | 7/1997 | |
| FI | 117586 B | 11/2006 | |
| NL | 1036231 C | 5/2010 | |
| WO | 98/33343 A1 | 7/1998 | |
| WO | 0184763 A2 | 11/2001 | |
| WO | WO 2009136404 A2 * | 11/2009 | ............ G06Q 20/12 |
| WO | 2010109060 A1 | 9/2010 | |
| WO | 2010/134808 A1 | 11/2010 | |
| WO | 2011088508 A1 | 7/2011 | |
| WO | 2013/045743 A2 | 4/2013 | |
| WO | 2014/048990 A1 | 4/2014 | |

OTHER PUBLICATIONS

International Search Report received for International Patent Application No. PCT/FI2012/000038, dated Apr. 25, 2013, 5 pages.

International Preliminary Report on Patentability and Written Opinion received for International Patent Application No. PCT/FI2012/000038 dated Apr. 10, 2014, 13 pages.

Extended European Search Report, Application/Patent No. 12834914.9-1958/2761553 PCT/FI2012/000038, dated May 5, 2015, 9 pages.

Finnish Patent Office, Office Action, Application No. 20155310, dated Oct. 18, 2016, 1 page.

* cited by examiner

PAYMENT SYSTEM

FIELD OF THE INVENTION

The invention relates to methods, devices, systems, and computer programs for making payments; particularly methods, devices, systems, and computer programs in which the processing of payment data and the payment transaction take place by means of a trust card.

BACKGROUND

In known payment systems, there are several operators, and their interaction and cooperation require complex systems and a trust relationship between the actors, wherein the costs increase as multiplication of the costs for each actor. The systems of prior art are difficult or impossible to implement without teleoperators, which further increases the complexity of the payment systems.

Systems based on the use of a SIM card are known from prior art, including, for example, the methods and systems known from FI 117586 B and FI 104937B. Here, subscriber-specific information is stored on a SIM card. These methods, too, are based on the use of teleoperators.

In some solutions of prior art, there exists a problem of the management of a payment card or a trust card with a payment functionality during the whole life cycle of the card. In general, the card is activated when delivered to a customer, and deactivated upon a request by the customer or upon exceeding the credit limit. The time period between the activation and the deactivation is fully incontrollable by the service provider, which increases the risk of misuse of the card.

In some solutions of prior art, lack of security in the processing of data of the trust card and other sensitive data poses a problem. In solutions of prior art, there is a risk that an unauthorized user can access sensitive data, for example on the user's terminal.

Consequently, better or alternative ways for making payments are needed.

BRIEF DESCRIPTION OF THE INVENTION

In the method according to the invention for making a payment, payment data is received by a user's terminal from a point-of-sale terminal, a secret for a payment application is received by the terminal from the operator's server system, a trust card is activated in said user's terminal by utilizing said secret of the payment application, and data of the trust card is transmitted from said user's terminal to said point-of-sale terminal for performing the payment transaction. In the method according to the invention for making a payment in a server system, a trust card is created in the server system, data of said trust card is transmitted to the terminal to be used for making the payment transaction, a secret of a payment application is formed in the server system, and access to said secret of the payment application is provided to the terminal for activating said trust card for making the payment transaction. The devices, the server system and the computer programs to be run in them function in such a way that the different parts of the method can be implemented, and these devices and systems may comprise e.g. communication means for communicating with a point-of-sale terminal or other devices.

The method according to the invention has the advantage that when access to the secret for the payment application is provided in the server system, the system is secure. The trust card at the terminal can be activated by the secret for the payment application obtained from the server system, possibly in combination with the user's secret, wherein the trust card cannot be used without providing the secret of the payment application to the terminal for activating the card. This providing is performed securely by utilizing cryptography, if the user has been successfully registered in the system for providing the secret of the payment application. In this way, security can be enhanced, and for example if the user's terminal is stolen, payments cannot be made without the server system. Moreover, it is possible to authenticate the user by requesting the user's secret (for example, a PIN code), and the trust card can be activated with the user's secret in combination with the secret of the payment application.

Here, a payment system is presented for providing electronic and verified payment data to the recipient of the payment, the payment system comprising the user's terminal and the operator's server system, and in which payment system the use of the payment application is configured to take place in two phases comprising registration of the user in the server system and the control of the validity of the payment application by means of the access right by using an encryption element and a secret of the payment application obtained from the server system at least at regular intervals. The user's terminal comprises a payment application for making payment requests, a trusted zone for the storage and use of a programmed encryption element, and RFID communication means for supplying payment data to the terminal of the recipient of the payment. Furthermore, the user's terminal comprises means for communicating with the server system using a protected communications protocol, and means relating to the encryption element for activating and deactivating the right to use the payment application. The user's server system, in turn, comprises a management application for identifying and managing a terminal, a database for user-specific data and keys, including a secret of each payment application, and means for communicating with the terminal by using a protected communications protocol.

By the payment system according to the invention, the state of the encryption element, i.e. the trust card, can possibly be managed during the life cycle of the encryption element, which increases the reliability of the payment system from the customer's point of view. Hereinbelow, the encryption element will be called a trust card.

The terminal may comprise a credit limit counter controlled by the encryption element. In this way, it is possible to make sure that the customer cannot exceed a predetermined credit limit within a given period of time. This increases the safety of the payment system e.g. in situations, in which the user's terminal has been stolen.

The RFID communication means of the terminal may comprise an NFC module. By means of the NFC module, payment data are transferred quickly from the user's terminal.

In an embodiment, the terminal comprises a programmed Java Card application in a trusted zone and an application authorized by it in an unsecured zone for setting up a user interface and a server connection. The Java Card application guarantees that any data that is sensitive in view of data security remains secret.

In another embodiment, the terminal comprises a trusted zone implemented by ARM technology on the circuit level, comprising an Obc provision system application and an Obc interpreter, and on the unsecured side an Obc Credential Manager application, an Obc Provision Client application and an Obc database, which are authorized. In this embodiment, the quantity of information in the trusted zone is small, wherein the memory capacity required of the trusted zone may be relatively low. The encryption element may be implemented in the trusted zone by means of LUA scripting language using an Obc interpreter.

Advantageously, the terminal comprises a middleware application between the NFC module and the OBC Credential Manager application. By means of the interpreter application, the commands received in the NFC module can be transmitted to the payment application managing the terminal.

Controlling the validity of a payment request at regular intervals may be configured to take place at intervals of 2 to 48 h, advantageously in connection with every payment transaction. In this way, the trust card is under continuous management and it can be made sure that the person using the terminal is an authorized person.

The server system is advantageously configured to perform an automatic transaction verification for each payment request. In this way, no separate labour is needed in the server system for performing the verification.

Advantageously, the secret for the payment application, obtained from the server system, is random. This enhances the data security further, because a single secret can be used for one payment transaction only.

Advantageously, the encryption element is configured to be downloaded dynamically and in an authorized manner from the server system to the trusted zone of the user's terminal during the registration. In this way, it can be made sure that the encryption element is correct, and at the same time, all the necessary keys of the encryption element are provided.

The validity of the payment request may be configured to be controlled by means of a PIN code of the payment application, which PIN code comprises in combination the secret for the payment application and the user's secret created at the registration stage. The use of two secrets increases data safety both ways, because in this way it is possible to make sure that both the user and the server system are authentic. This, in turn, decreases the need for trust between the user and the server system.

The RFID means of the user's terminal for communication with the server system can be separate from the means for controlling the validity of the payment request. In this way, the terminal of the recipient of the payment does not in any case have a chance to see user-specific secrets.

In one embodiment, the trusted zone belonging to the terminal and implemented on the circuit level is a prefabricated SoC circuit connected to the terminal.

Advantageously, the payment system further comprises the terminal of the recipient of the payment, equipped with RFID means, particularly an NFC module, for the transfer of payment data. In this way, the payment data can be transferred quickly and wirelessly from the terminal of the recipient of the payment to the user's terminal and further to the server system, for authentication.

The overall operation of the system consists of a minimum number of operators, reducing the risk caused by their mutual interaction and trust control, thereby making the system simple to implement. The small number of operators also increases the safety and dynamicity of the system, as well as the focusing of context, such as, for example, advertising, relating to the transactions and displayed to the user.

The system presented herein is designed to function in an environment, in which the terminal controlled by the user comprises an RFID module, a trusted zone, as well as implements an advantageous functionality between the RFID module and the trusted zone in view of this system.

In the following, the operating environment of the payment system will be described. In this context, the term trust card is used, referring to a programmed identification and encryption element that contains a secret key and a public key created in said element by software, a certificate, a CA certificate, the identification data of the trust card (account number, CV code, etc., as in smart cards), as well as an application for managing and/or processing these, and a protocol defined in the application for communication with the operator's server. Completely new components in the payment system include the application and the communications protocol on the application layer, as well as the keys and certificates generated by it.

In the operating environment of the system:
The operator refers to the provider that is responsible for the operation of the server system and the trust card.

The user's terminal comprises a secure trusted zone which is protected by methods according to and complying with the requirements of issuers that grant smart cards or similar digital items which bring added value to the user. These methods can also be called credentials. A trusted zone can be a virtual zone implemented by means of software, or a zone implemented on the circuit level. A trusted zone implemented on the circuit level, in turn, can be technology of a component manufacturer, such as ARM or Inside Security. The trusted zone can also be a SIM card or a part of an external or internal chip module to be inserted in the terminal. The chip module can also be a part of a combined module to be installed internally or externally as a part of the terminal. A combined module refers to a combination of integrated circuits with, for example, WLAN, BT/NFC integrated in the same circuit.

In this document, a trust card refers to a virtual trust card stored on a trusted zone of the operating system of a terminal, or on a trusted zone of an auxiliary device included in the terminal, or another safe memory area allocated and identified for the operator, the use of the card corresponding to that of a conventional debit or credit card. The trust card contains sensitive data as well as a set of safety properties and primitives, by means of which authorized parties can communicate with it. Simply put, the trust card is an application that controls access to the payment application and contains the keys and certificates needed for encryption of the payment application, an encryption algorithm, and possibly also a credit limit.

In this payment system, sensitive data include PIN codes, keys, certificates, as well as any other sensitive data defined by the operator and relating directly or indirectly to the payment system.

The use of the trust card requires the decryption of a so-called shared secret between the user and the server system, so that the trust card can be used. The shared secret (PIN code) is a combination of the secret known to the user and the secret stored in the server system, defined by the operator and changed at regular intervals.

The trust card is authenticated by a unique identification of the trust card or by an identifying value derived from it.

The trust card communicates reliably and safely over the Internet or another medium with a server system connected to it, a system owned by a third party, a trust card, another trust card, or an external contactless reader that supports the functionality of making a payment.

Reliable communication can be implemented by a bidirectional safety mechanism complying with the SSL/TLS protocol by using keys of optimized size with respect to the computing capacity available, usability and the unique safety requirements of the operations. Alternatively, all the data communication outside the trusted zone is encrypted with an encryption algorithm in the trusted zone, by using the encryption keys of the zone read.

The trust card retrieves data needed for the functionality dynamically from the server system connected to it.

The trust card operates with the server system of the operator.

The operator's server system is responsible for the security and the management of the trust card.

The user is a person who interacts with the terminal and the trust card. The use of the trust card requires the authorization of the user, the trust card and the server by the system of the operator.

The user has a terminal that supports RFID technology or other local communication technology, whereby it is possible to set up a connection to the Internet or another medium.

The server system is connected to the Internet or another medium.

The server system contains a secure trusted zone, in which the sensitive data to be used for initializing the trust cards is stored.

LIST OF FIGURES

Figure 2:
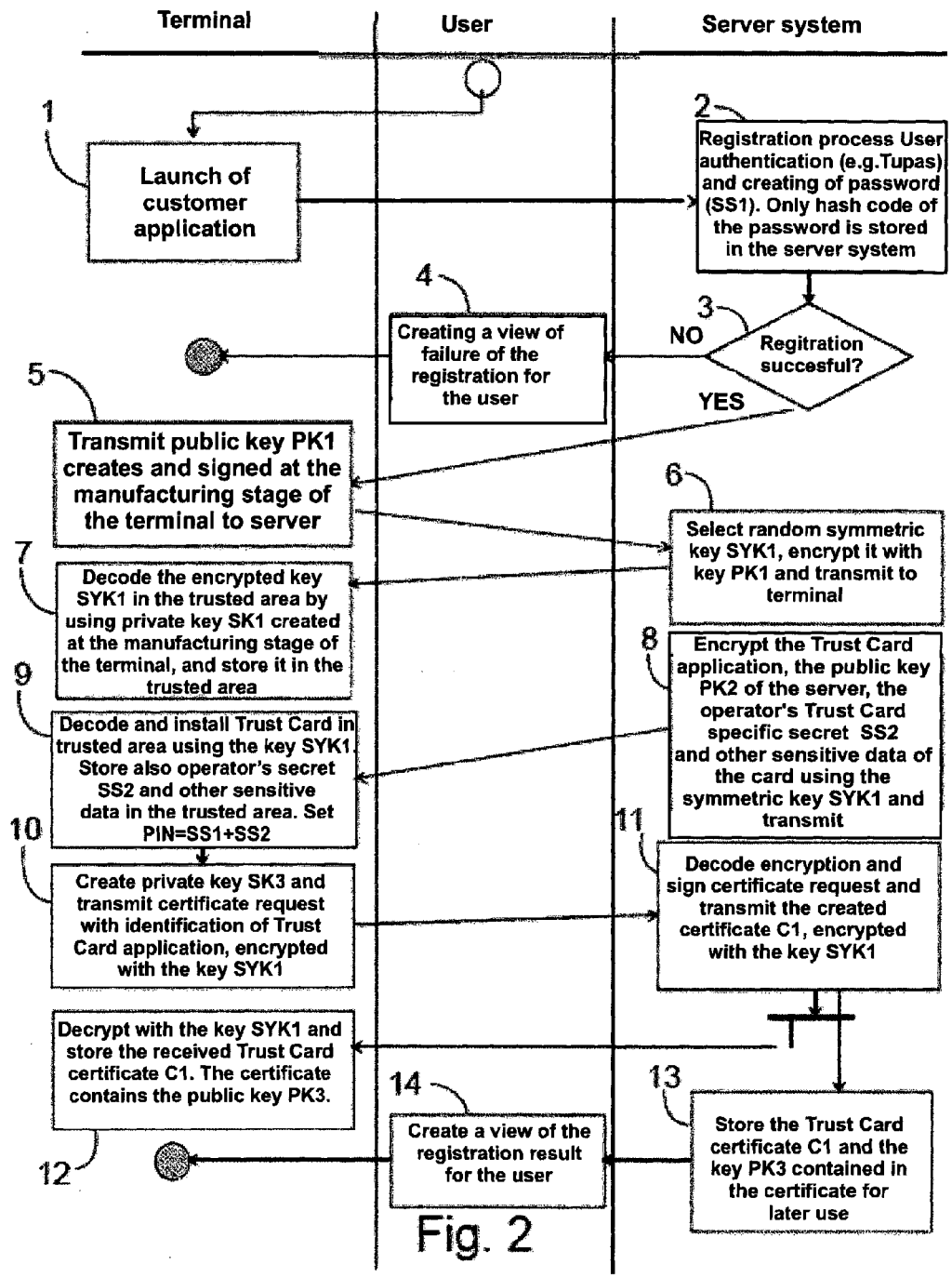
Figure 3:
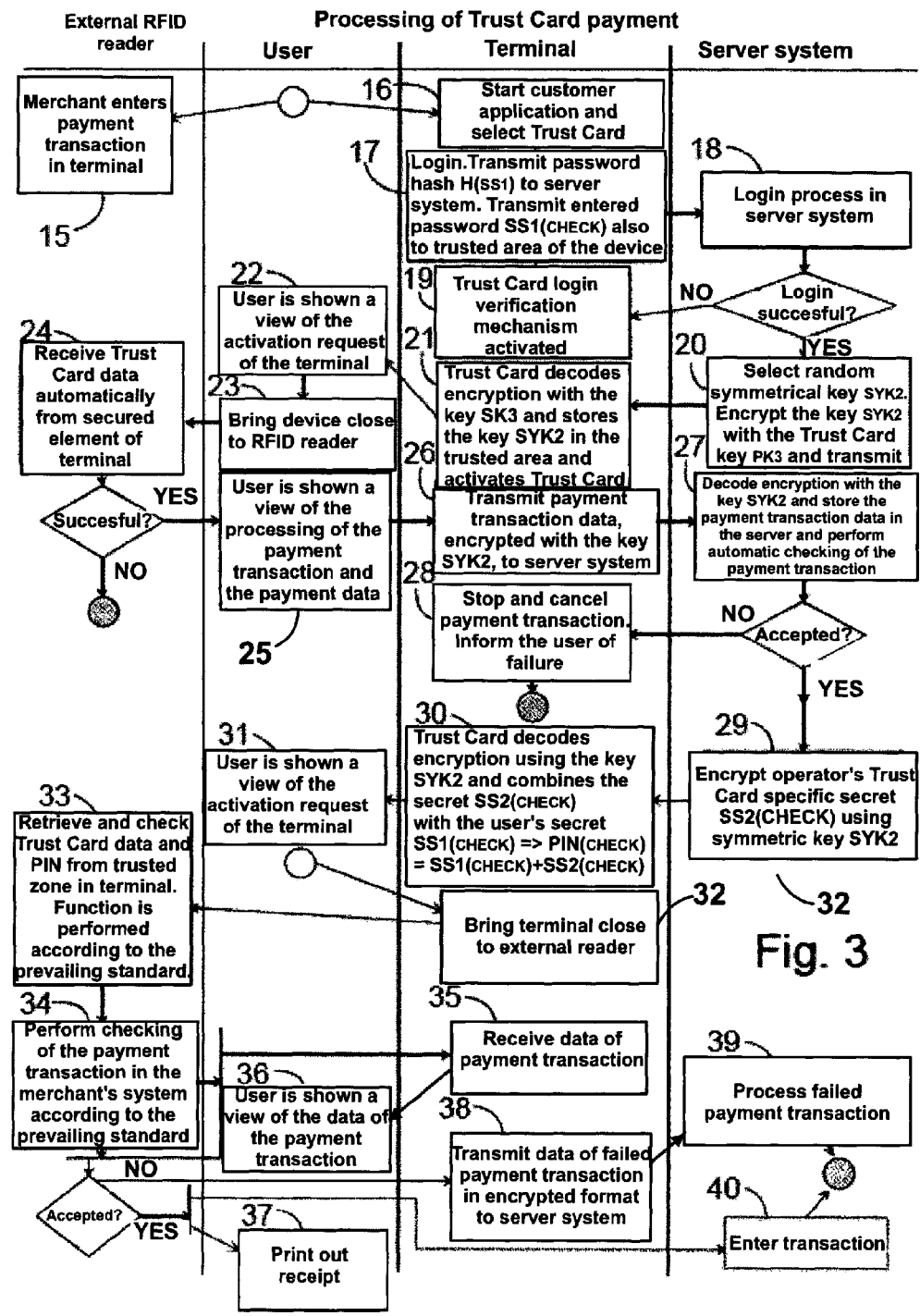
Figure 4:
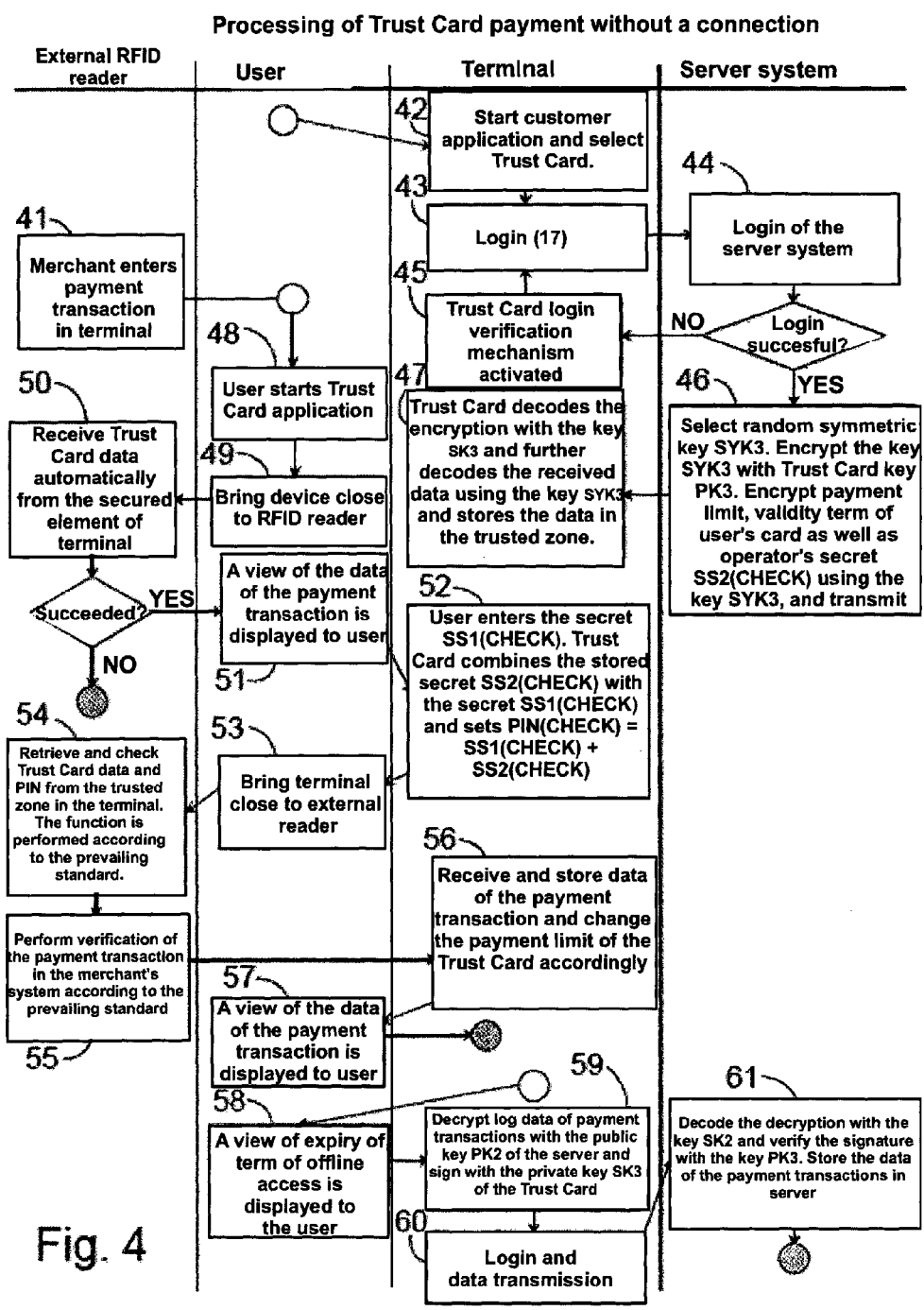
Figure 5:
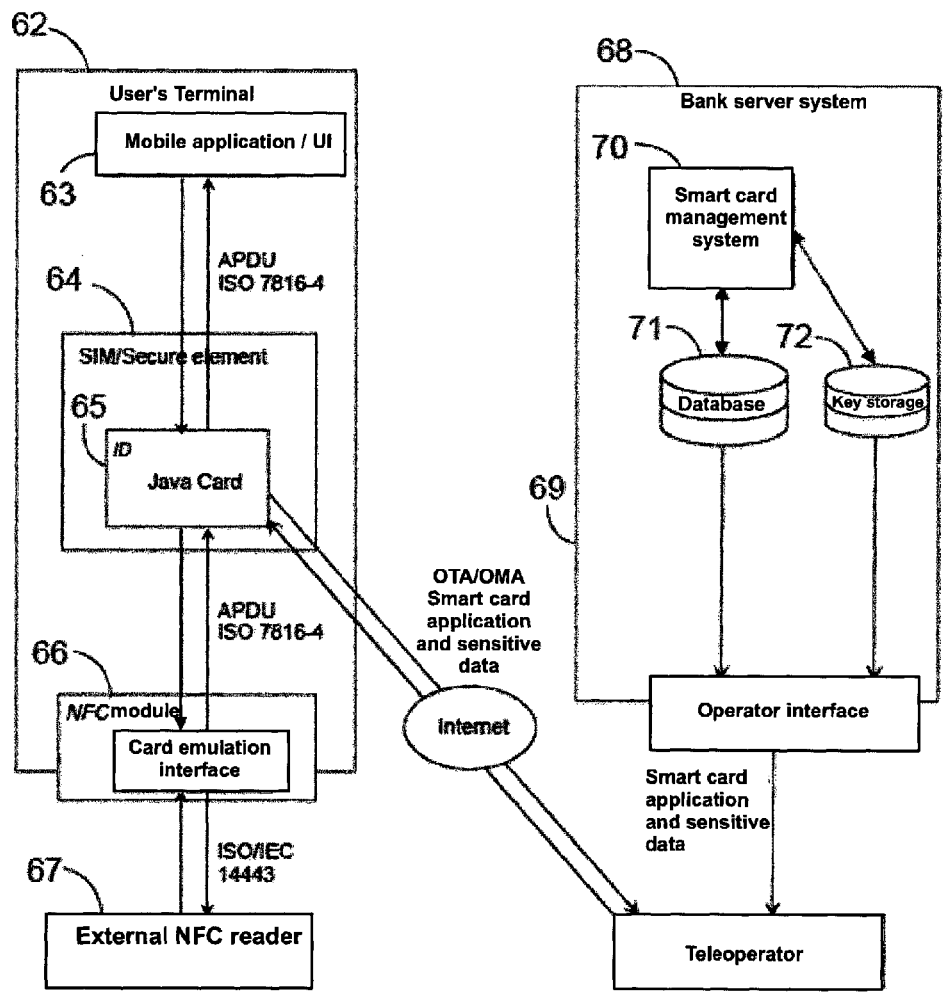
Figure 6:
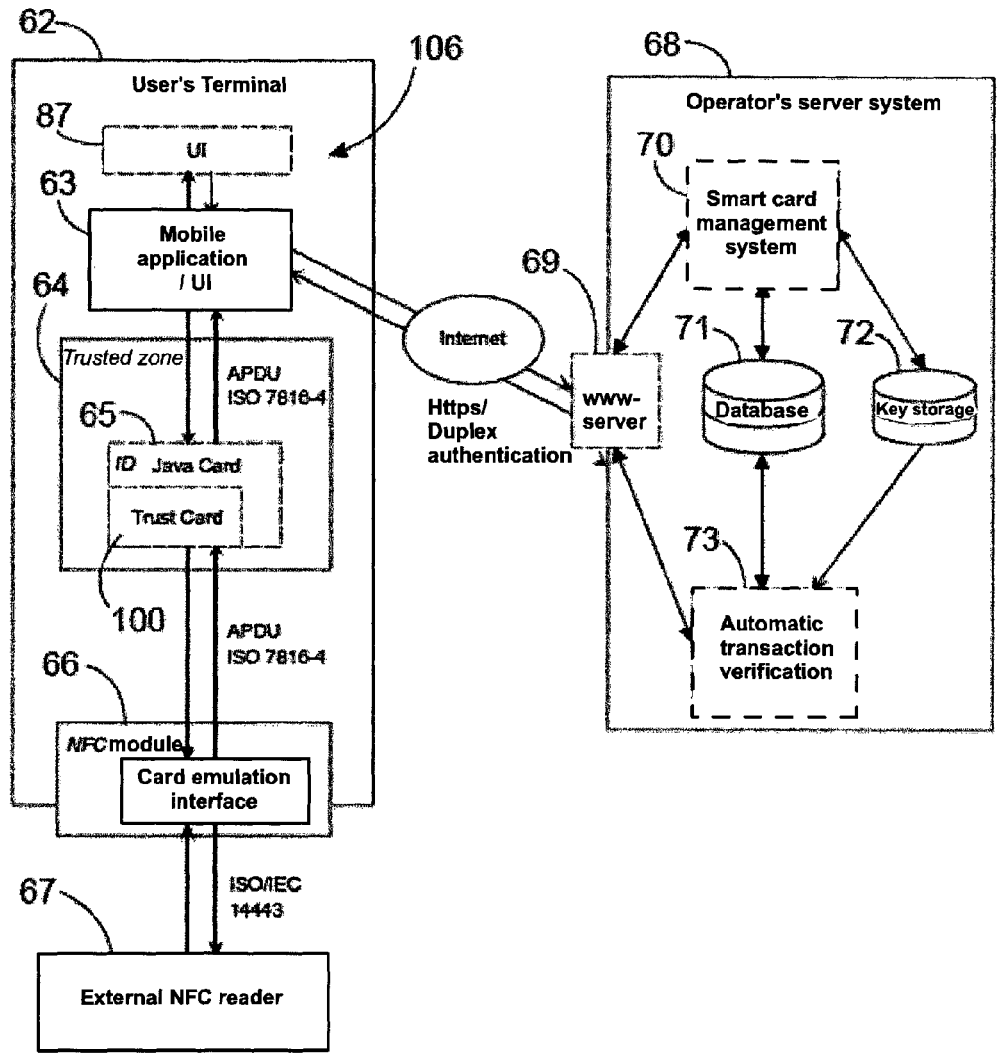
Figure 7:
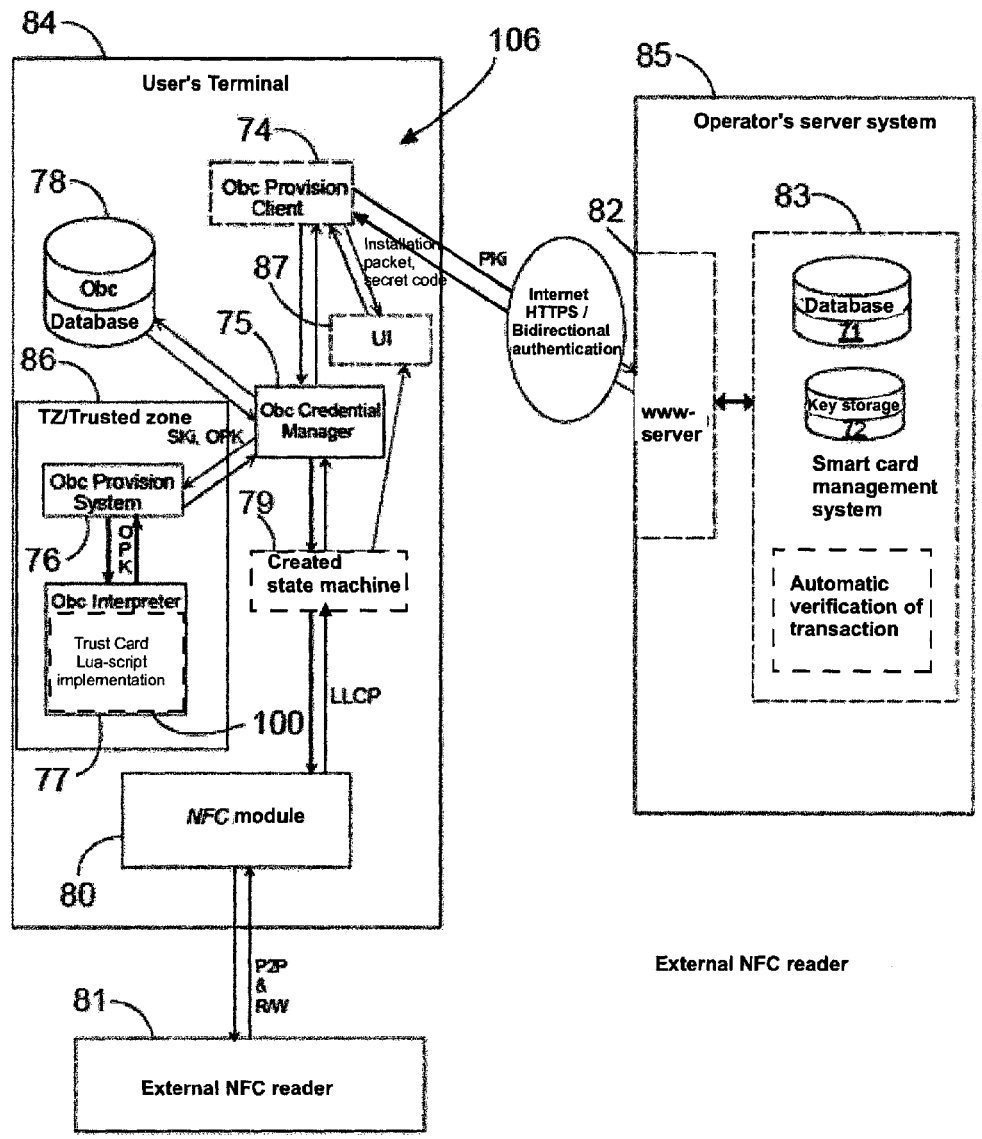

In the following, the invention will be described in detail with reference to the appended figures which illustrate some embodiments of the invention, in which FIG. 1 shows an overall description of a payment system according to the invention, FIG. 2 illustrates the registration of a trust card of a payment system according to the invention in a block chart, FIG. 3 illustrates a payment transaction in an embodiment of a payment system according to the invention, in a block chart, FIG. 4 illustrates a payment transaction in another embodiment of a payment system according to the invention, in a block chart, FIG. 5 illustrates the architecture of a payment system according to the prior art, FIG. 6 illustrates a JAVA Card architecture according to an embodiment, FIG. 7 illustrates TrustZone and Obc architecture according to another embodiment.

DESCRIPTION OF EMBODIMENTS OF THE INVENTION

In this context, a payment application refers to all the software components of a terminal, both in the trusted zone and in the unsecured zone, which together utilize data and keys of an encryption element in the trusted zone, as well as RFID means and communication means. Furthermore, the communication means refer to those software components which take care of communication with the server system via an Internet connection. In FIGS. 1 to 4, the trust card is generally called a Trust Card.

According to FIG. 1, the payment system according to the invention consists of a terminal 62, 84 managed by a user, and a server system 65, 85 of an operator, as well as the respective entities presented in this description. The system supports autonomous contactless payment transactions, in which the user can perform a payment transaction via his/her terminal 62, 84 that supports RFID technology, and particularly via its payment application. A personalized copy of a trust card 100 stored in the server system 68, 85 is installed for each user of the system, or alternatively, each user has his/her own parallel trust card in the server system, which card is installed dynamically in the user's terminal. In both cases, the owner of the account connected to the card is the operator, whereby the functionality of the system remains the same in both cases. The operator's server system 68, 85 is responsible for the whole life cycle of the trust card 100 to be transferred to the terminal 62, 84, including its installation, updating, personification, invalidation, and destruction. Thus, the number of parties causing risks and costs in the total system, in the payment transaction and in the functionality relating to these can be minimized.

In the system, an external terminal, that is, an RFID reader 67, 81, is with a merchant, and the terminal 62, 84 with a customer. Hereinbelow, the external RFID reader will also be called the external reader. The terminal is advantageously a mobile phone, but it can also be a tablet, a digital wrist device, a portable computer, or any corresponding device which is equipped with a display and a user interface and which can be supplemented with an RFID. In the system according to the invention, the data communication relating to the authentication of the customer 102 takes place via the terminal 62, 84 of the customer 102. At first, the authentication is performed via the terminal 62, 84 in the server system 68, 85, and the result is returned back to the terminal 62, 84. The merchant's external reader 67, 81 then verifies that result from the trust card 100, for example according to the NFC protocol. The result cannot be forged because of the security classification and/or the trusted zone. If the result is OK, the transaction is accepted as such, if the merchant's external reader 67, 81 accepts offline verifications in connection with mobile payment. Alternatively, the external reader 67, 81 forwards the verification result further to a bank 104, if this is what the merchant wants. The system can be applied without this step, particularly if the operator is the card issuer.

Next, we will explain the registration of the user in the payment system with reference to FIG. 2. By default, the user's terminal comprises the CA certificates hardcoded by the device manufacturer, an encryption algorithm, a public key PK1 and a secret key SK1 for encryption and authentication in general. The user downloads the application of the server system from a site defined by the payment system, opens it in the terminal used, and is authenticated for the application, for example by applying the TUPAS service or a corresponding certified authentication service. The user is presented a view of registration in the service of the payment system, and the data entered by the user are transmitted in a verified form to the server system in step 1. The data given by the user enter the service system where the user's identification and credit rating is verified in step 2 of registration. Upon registration, the user creates him/herself a user secret, that is, a password SS1, of which only a hash code is stored in the server system. In step 3 it is checked if the registration was successful. If the user's data are found valid, the data are stored in the server system and the registration process is concluded. In a failure situation, the registration process is cancelled, the data given by the user are deleted, and the user is displayed a view of failed registration in step 4. Here, the downloading of the card is dynamic, and the user's PIN code is selectable by the user. This makes it easier to remember the code and reduces the amount of work by the card issuer.

A successful registration process is continued in the server system to create data for identifying the user, and a signed result of the successful registration is transmitted to the user's terminal. Furthermore, via a request interface provided from the trusted zone, the application of the server system requests for the public key PK1 allocated to the terminal and verified at the stage of its manufacture, and transmits the key to the server system in step 5. The server system creates a symmetric encryption key SYK1 which it encrypts with the public key PKS1 obtained from the terminal and transmits back to the user's terminal in step 6. In the terminal, the symmetric encrypted key SYK1 is transferred to the trusted zone via the request interface provided, and is decrypted there with the terminal's private key SK1, after which the symmetric encrypted key is stored in step 7.

Next, the server system transmits the payment application, the sensitive data relating to it, that is, the trust card specific secret SS2 as well as the public key PK2 of the server system, encrypted with the symmetric key SYK1, to the terminal in step 8. In step 9, the packet transmitted by the server system is decoded by using the symmetric key SYK1 created by the server system. The trust card personalized for the user, as well as the secret SS2 of the server system are stored in the terminal via the request interface provided to the trusted zone. At the same time, the PIN code of the terminal is set, formed of the password SS1 selected by the user, and the secret SS2 of the server system. In this context, the public key refers to, for example, a public key relating to an asymmetric RSA encryption algorithm.

In the payment system according to the invention, depending on the size of the trusted zone, sensitive data can be stored directly on the trusted zone or, alternatively, the sensitive data can only be encrypted in the trusted zone. Thus, after the encryption, the encrypted sensitive data can be stored anywhere in the unsecured memory space outside the trusted zone of the terminal. In any case, the encryption algorithm and its keys are stored in the trusted zone. When the sensitive data is encrypted outside the trusted zone, the payment application employs keys stored in the trusted zone for encrypting and decrypting all data transmissions.

After the formation of the PIN code, the user's trust card is provided with a private key SK3, and a certificate request with the identification, encrypted with the symmetric key SYK1, is transmitted to the server system by using a secure medium in step 10. In the server system, the encryption is decoded by using the private key SK2 of the server system, and the certificate is signed with the CA certificate of the server system in step 11. After this, the signed CA certificate is encrypted again by using the symmetric key SYK1. Finally, the signed trust card certificate C1 is transmitted via an encrypted and secure medium to the user's terminal, to the user specific trust card, in step 12. In step 13, the signed trust card certificate C1 is decrypted with the key SYK1 and stored in the trusted zone. The certificate C1 also contains a public key PK3. The signed trust card certificate C1 and the public key PK3 are also stored in the server system for later uses. Finally, the user is displayed a view of the successful registration result in step 14, and the user is given a chance to log in the operator's server system.

Next, with reference to FIG. 3, we will describe a payment transaction in the payment system according to the invention. In the initial situation, the user knows a password SS1, the server system has a secret SS2 and a public key PK3, and a certificate C1 and a public key PK3 are stored in the terminal. In step 15, the merchant enters the data of a payment transaction in an external contactless trust card reader which supports RFID technology. In step 16, the user opens the payment application in his/her terminal and activates the payment application of the trust card by applying a special button intended for this. As a result, the user is displayed a login window, in which the user is asked to enter the password SS1(check) in step 17. The hash codes of the entries are transmitted in an encrypted form and via a secure medium to the server system which processes the received data efficiently in step 18. At the same time, the entered password SS1(check) is also transmitted to the trusted zone of the terminal and checked there. If the login fails, a verification mechanism is started in the terminal in step 19, comprising processing instructions for an error situation, including, for example, the allowed number of incorrect entries before the trust card is reset. In this case, the user can obtain a new card only by registering in the system again. When the login is successful in step 20, the server system selects a random symmetric key SYK2 from its trusted zone and transmits it to the user's terminal, encrypted with the public key PK3 of the trust card.

In step 21, the terminal receives the packet from the server system and decrypts it with the secret key SK3. After this, the key SYK2 is stored in the trusted zone, which activates the trust card by means of its intrinsic state machine. First after this, the trust card can communicate with other parties than the server system. When an external reader is a communicating party, the trust card always operates in a passive mode, but without the above-mentioned activation, the trust card does not react to a connection request by the external reader or any other active or passive RFID compatible terminal, directly or via an RFID module. On the other hand, in another embodiment, the trust card can be active, as in FIG. 6, but the operation still requires periodic interaction with the server of the operator.

After the activation, in step 22 the user is displayed a view for bringing the terminal to the vicinity of the external reader, and in step 23 the user brings the terminal to the vicinity of an external reader, the external reader reading the necessary data of the trust card automatically from the trusted zone of the terminal in step 24. The external reader returns the data of the payment transaction to the reader, which data are automatically transferred by the RFID module to the trusted zone of the terminal. In step 26, the data of the payment transaction, encrypted with the key SYK2, are transmitted from the terminal to the server system for processing and storage. A processing view of this is displayed to the user in step 25. In step 27, the server system decrypts the payment data transmission with the key SYK2 and performs an automatic checking whether the customer is authorized to perform the transaction. If the checking fails, the procedure is interrupted and the user is displayed a view of the reason for the failure in step 28. Furthermore, the operator's automatic verification mechanism checks what went wrong in the checking and deals with the situation accordingly. For example, if the error is found to be very serious, such as unauthorized use of the card or appearing on the list of stolen cards, the trust card is invalidated.

If the payment transaction is accepted by the verification system of the server, the secret SS2(check) of the server system, stored in the server system in a form encrypted with the key SYK2 and tied to the identification of the trust card in question and needed for its operation, is transmitted to the terminal in step 29. In step 30, the receiving customer application transmits the message further to the trust card, in which decryption is performed with the key SYK2. The secret SS2(check) of the server system and the user's password SS1(check) are combined to form a PIN(check), and the value is entered in the intrinsic state machine of the trust card in the terminal. Furthermore in step 31, the user is displayed a view for bringing the terminal to the vicinity of an RFID reader, wherein the PIN(check) is checked by comparing it with the PIN generated at the registration stage and composed of the secrets SS1 and SS2. The successful checking enables communication by middleware with the NFC module. An advantage in the above-described arrangement may be that not so strict requirements need to be set for the trusted zone in the terminal, because a secret that is used for making the payment is obtained from the server for performing the payment transaction (for activating the trust card).

In general, the actual secrets SS1, SS2 are created in the registration step, and from these, a PIN, which secrets, encrypted with the symmetric key, are stored in for example the trusted zone or elsewhere in the memory of the terminal. In connection with the payment transaction, the user provides the SS1(check) and the server system the SS2(check), which secrets are used to create a PIN(check). In this way, it can be made sure in connection with the payment transaction that the user is the authentic user of the terminal who knows the SS1 of the registration step, and the server is also the authentic server that knows the SS2 of the registration step. Consequently, the PIN code is decentralized between the user and the server, whereby double authentication is needed to secure the authentications of both parties. The user does not at any stage known the actual PIN code of the terminal. The intrinsic state machine of the trust card is activated by comparing the PIN(check) with the actual PIN, and if they match, the intrinsic state machine is activated. It should be noted that according to the EMV payment standard, the PIN code is not necessarily checked or required for small payments.

In step 32, the customer brings the terminal equipped with RFID communication means to the vicinity of an external reader. The external reader reads the data of the trust card and the result of checking of the PIN code from the trusted zone in step 33. In step 34, the data are forwarded to the issuer of the original trust card of the server system who returns a response back to the external point-of-sale terminal participating in the transaction. The external reader can also perform an offline checking in step 34, in which case the result of checking the PIN code, read from the terminal and accepted, leads to the acceptance of the payment transaction in the merchant's system, and a receipt corresponding to the transaction is printed out for the customer from the external reader in step 37. The data of the payment transaction are also automatically transmitted by the external reader to the trust card in step 35 and further to the server in step 40. After this, the user is informed of the conclusion of the transaction, and the terminal can be removed from the vicinity of the point-of-sale terminal in step 36. If the checking fails in step 34, the data of the payment transaction are transmitted in encrypted form to the server system in step 38. The server system marks the transaction of step 27 failed in step 39. Finally, the user is informed of the failure of the transaction, and the payment transaction is stopped.

The payment transaction can also be performed according to another embodiment as shown in FIG. 4. The second embodiment of the payment system enables the payment transaction without direct communication with the server of the operator. In this embodiment, the server of the operator comprises general and user-specific instructions on how often the user has to perform the authentication defined by the operator, the checking of the state and the transactions of the trust card, and the synchronization with the server system. Thus, the trust card can function and can be used for payment transactions independently without authorization by the server system of the operator, until a determined time limit expires or a spending limit stored on the trust card is met. The user is informed of both events before the expiry of the validity period or the exhausting of the balance limit. If desired, the user can perform reactivation any time before the expiry of the term or after it, in which case the trust card cannot be used until it is reactivated.

The reactivation can be performed, as shown in FIG. 4, by logging with the terminal in the operator's system in steps 42 to 45, as presented in the first embodiment of FIG. 3. Furthermore, the server system encrypts the payment limit, the validity term of the trust card and the operator's secret with the certificate of the trust card of the terminal of said user in step 46. Here, the validity term of the trust card refers to the security policy defined by the operator, because the trust card has to be reactivated by the server in order to be used again. An example of the validity term could be one day. Next, in step 46 the encrypted data are transmitted to the terminal, in which they are transferred to the trusted zone and stored in step 47.

In step 48, the payment transaction is activated by starting the application in question and bringing the terminal to the vicinity of an external reader in step 49. On the other hand, the activation of the payment transaction can also be performed without starting the application, in which case the application is started by the external reader. The external reader retrieves the data of the trust card from the trusted zone in step 50, and a view of the data of the payment transaction is displayed on the user's terminal in step 51. In step 52, the user enters the password SS1 in the terminal and, as an acknowledgement, brings it to the vicinity of the external reader again in step 53. The external reader retrieves the result of the verification of the PIN code of the trust card in step 54 and processes the transaction in step 55. Further, the external reader transmits the data on the payment transaction to the trust card which in step 56 stores them on the trusted zone and changes the remaining balance according to the transaction. A corresponding view of this is displayed to the user in step 57. In an embodiment, the steps 50 to 54 can be combined in such a way that the password SS1 is first given to either the terminal or the external reader, after which the terminal is brought to the vicinity of the external reader. This is followed directly by acceptance or rejection, the result being stored accordingly in the terminal in step 56, and a view of the payment transaction being displayed to the user in step 57. It should be noted that according to the EMV payment standard, the PIN code is not necessarily checked or required for small payments.

When the card validity term according to the security policy of the operator is expiring, for example after one day from the previous activation, a view of this is displayed to the user in step 58, the user being asked to activate the trust card before the next use. Furthermore, in step 59 the terminal encrypts a verification and adds it to a log file that contains the payment transactions, to be transferred in step 60 from the trusted zone of the terminal over a safe connection to the server system, and stored in step 61. In a corresponding manner, the trust card and the user are authenticated in step 27 of FIG. 3, and the trust card is reactivated by means of steps 44 to 47 of FIG. 4.

The arrangement of FIG. 4, in which the secret of the payment program is retrieved into the user's terminal before the payment transaction at the merchant's terminal, can provide the advantage that the arrangement is capable of performing the verification of the payment transaction automatically upon request by the merchant's terminal, in even less than half a second. Furthermore, the arrangement has the advantage that no on-line connection is needed from the user's terminal to the server system. This solution is advantageous in, for example, a grocery shop.

In both of the above-presented embodiments, the settlement of accounts to the merchant can be performed in the same way as in conventional credit card systems. The merchant transmits the data of the successful payment transaction in a packet to the bank or credit company for settlement of accounts. On the basis of the data of the payment transaction, the bank or credit company gives an account to the merchant. This step is not illustrated in FIG. 3, but it should be understood as a natural part of the system.

In connection with the payment system according to the invention, RFID (Radio Frequency IDentification) is used for transmitting the payment data to the recipient of the payment, that is, the merchant. RFID is a method for remote reading and storage of data by means of RFID tags. Advantageously, the system according to the invention employs a particular application of RFID, NFC. In this context, NFC, or Near Field Communication, refers to technology that enables radio frequency remote identification based on RFID at very short distances of not more than a few centimeters. The greatest difference to conventional RFID tags is the fact that an NFC device can be used both as a reader device and as a tag, contrary to conventional RFID devices. The NFC can be used in connection with mobile phones by providing the phones with NFC functionalities. The NFC can also be retrofitted in the phones by means of particular SIM or microSD cards. The NFC connection is based on the induction of an electromagnetic field at the radio frequency of 13.56 MHz. The data transmission rate can be 106, 212 or 424 kbit/s, which are suitable for the transmission of small quantities of data. When processing larger quantities of data, the NFC can be utilized to set up the connection in which the actual data transmission is performed via, for example, Bluetooth.

The NFC is only used for the communication between the terminal and the merchant's reader in the system, according to the NFC forum standards. The payment application makes sure than the necessary bank data and the authorization result are provided to the external reader via an APDU connection (APDU=application protocol data unit). Furthermore, when the term RFID or NFC is used, a WLAN (Wireless Local Area Network) can also be used, whereby the point-of-sale terminal can be located far from the paying customer, while it is at a distance of about 5 cm in the case of NFC. Both are already standardized connection formats. WLAN can be used, for example, as follows. A customer enters a store and activates the trust card by means of the NFC over the service of a service provider. The NFC is set to a listening mode, and simultaneously the WLAN is activated. This can be done in the NFC standard, like the activation of Bluetooth. The customer goes shopping in the store and purchases items by utilizing NFC poster chips attached by the merchant onto the price tags. The user flashes his/her terminal with the NFC chip in an active state over the price tag, and the price and/or quantity is entered over the APDU protocol to the terminal in the system of the service provider. After the customer has finished shopping, he/she can pay the items directly over the WLAN or directly over the NFC by the system according to the invention. When paying over the NFC, the merchant must have an external NFC reader, and in the case of the WLAN, the merchant must provide a WLAN network inside the store.

The APDU commands presented by the external NFC reader of the recipient of the payment, i.e. the merchant, to the user's terminal in the payment transaction are presented at the end of the description section. At the end of the description, there are also Tables 1a to 2b, in which Tables 1a and 1b show the variables used in the payment transaction of FIG. 3 and their different values in the different steps of the payment transaction. The TZ value shown in Tables 1a and 1b corresponds to the steps of FIGS. 2 and 3. In a corresponding manner, Tables 2a and 2b show the variables used in the payment transaction of FIG. 4 without a network connection, and their values in the different steps of the payment transaction. The TZ value shown in Tables 2a and 2b corresponds to the steps of FIGS. 2 and 4.

FIG. 5 is an illustration of a system representing the state of the art. According to the figure, the terminal has a trusted zone in which sensitive data is stored. All the communication between the terminal and the server system takes place via a teleoperator. The use of the teleoperator increases the complexity of the system and increases the risk of a data security breach in the form of extra steps in the process. However, the greatest problem is the fact that in systems controlled by teleoperators, the secret of the server system is supplied to the user's terminal in connection with registration or activation only. After this, the trust card of the terminal is not managed in any way in connection with payment transactions. Only the closing of the trust card, for example, in connection with fraudulent use of the trust card, is an administrative measure by the teleoperator. In systems according to the invention, the payment transaction by the user normally requires only one PIN code, by which the user verifies the payment.

In the following, we will explain the high level architecture of embodiments based on two different architectural solutions of the payment system according to the invention in view of essential features of the payment system, with reference to FIGS. 6 and 7. In FIGS. 6 and 7, the bolded entities illustrate the application and system solutions owned and developed by the system of the operator, whereas the white entities are subassemblies described in other standards and specifications. In a corresponding manner, the bolded communication sequences represent methods and embodiments based on the operator's own solutions, whereas the thinner sequences represent solutions defined in different other standards advantageously selected by the operator in view of the industry and the technology.

The user's terminal contains a trusted zone preassembled in the terminal by the device manufacturer or an interested party. The trusted zone can be a zone created in the terminal at the manufacturing stage, a zone placed on a SIM card or an external memory card, or a virtual zone created by programming. The trusted zone functions in general in the TEE (Trust Execute Environment) zone; said trusted zone is also called by the acronym Tree. In example situations, the term TEE is used. The security classification of the TEE zone is verified by a particularly strong and secure encryption method. Normally, this means that the integrity of the TEE from the point of view of security is checked by the terminal manufacturer at the manufacturing stage by means of an integrated encrypted character string in the encrypted zone. Such encrypted zones include, for example, eFuse, which is based on IBM technology. The character string cannot be changed or read by the application running in the encrypted zone during the running. Said process is called an encrypted boot sequence.

It is characteristic of the TEE environment that in the same terminal it is possible to perform not only the operations limited by the insulated secure zone but also operations of the unsecured zone during the same boot sequence. Secret and permanent data which remains in encrypted and integrated form, can be stored in the trusted zone. The integrity of the TEE environment can be verified, if necessary. The unsecured zone can be formed on any operating system platform, for example Symbian. In the unsecured zone, a programming language translated to machine language is used, which may be for example QML/QT/C++ or HTML5. Data traffic in the unsecured zone is encrypted by the trust card of the trusted zone and therefore remains protected. Thus, most of the sensitive data can be stored outside the trusted zone.

In the TEE environment, there are various encrypted platforms with different features and functions as a trusted zone. The trusted zone can act as a virtual part of the operating system, that is, as a software component, as a trusted zone implemented on the circuit level, as an external physical chip module, in both roles simultaneously. Most common trusted platforms include TPM (Trusted Platform Module) and MTM (Mobile Trusted Module), both specified by TCG (Trusted Computing Group). For some parts, the MTM is identified with mobile devices, but in other respects, the TMT and TPM platforms largely resemble each other. Other encrypted platforms include MShield, which is based on technology by Texas Instruments, and Java Card which is implemented by software and is based on technology by Oracle, and TrustZone which is implemented on the circuit level and is based on technology by ARM.

In this context, the acronym ARM (from the words Advanced RISC Machines) refers to a 32 bit microprocessor made with microprocessor architecture, i.e. SoC (System-on-a-chip) integrated circuit. The ARM is a RISC architecture and is nowadays particularly common in the processors of personal digital assistants, mobile phones, and embedded systems. The ARM is very suitable for terminals of small size, because it can be implemented with relatively little logic in relation to its performance. In spite of their small size, ARM processors are considerable processors, because they can contain, for example, a memory control unit which enables the running of sophisticated operating systems.

In the ARM processor, the trusted zone is a so-called Trust Zone. Such a trusted zone is found, among other things, in an ARMv6KZ processor. The trusted zone can be implemented by means of two virtual processors which are supported by hardware based access control. As a result, the applications can utilize two areas in parallel, one being trusted and the other being unsecured. Access to the trusted zone is only provided for certain applications which are secured by the trusted zone. It is possible to use a larger operating system in the unsecured zone and a smaller protected system in the trusted zone. The trusted zone and the unsecured zone can be used independently of each other.

Alternatively, the system can be implemented in such a way that the trusted zone is a SIM card or the trusted zone is provided in an external or internal chip module to be installed in the terminal. The trusted zone implemented by software can be, for example, a Java Card which contains strong internal protections.

It is essential that the trusted zone meets the safety classification required of contactless smart cards and payments systems by financial institutions and card issuers, such as banks, for which safety classification the EMVCo specification is generally used as a reference. Thus, the operator that owns the server system also acquires and stores safely the necessary keys for operating with said trusted zone. To put it more precisely, the server system also contains a trusted zone that meets the safety classification required of payment systems. At present, IMEI authentication and SIMLock protocol which are used in SIM/UICC environments do not in all respects meet the security criteria required of such a system. It has been found that with little effort, by using a USB cable and a personal computer, it is possible to bypass said authentication method.

FIG. 6 shows how the payment application 106 can be implemented for example as a Java Card based solution with a security element 65. Thus, when the user is registered in the server system 68 of FIG. 6 according to FIG. 2, the trust card management application 70 of the server system 68 packets the Java Card application as a JAR/CAP file and generates APDU command sequences from it for installation.

After this, the produced installation files are encrypted with the keys required by the trusted zone and are transmitted over a https connection to the host application 63 in the user's terminal according to steps 5 to 9 of FIG. 2. The host application acts as middleware between the server system and the trust card and provides the user with a user interface by means of allowed functions and views. If allowed by the safety policies of the trusted zone in the terminal, the Java Card application communicates directly with the www server 69, and thus the host application 63 is only used as an interface to the views displayed to the user. On the other hand, the user interface 87 may be a separate software component, as shown in FIG. 5. The host application 63 is also signed according to the safety requirements of the TEE area, so that the installation packet received for it can be installed in the trusted zone in the JCRE environment by employing the APDU command sequence contained in the installation packet. On the other hand, if desired by the operator for a reason, the installation can also be performed by an external trusted operator which can be called by the general acronym TSM (Trusted Service Manager). Thus, the overall responsibility for the installation and management of the trust card is transferred to a centralized trusted third party. The processing, authentication and management of payment transactions is further performed by the operator, as presented in the depiction of the payment transaction in FIGS. 3 and 4.

In the payment transaction of FIG. 3, the user activates the operator's trust card by starting the user's payment application at the terminal. When started, the user's payment application automatically performs an APDU primitive SELECT which activates the trust card of the operator of this document on the basis of its identification (ID). However, the trust card is internally set in a state in which its real activation is not possible until the operator's secret SS2 (check), which is only known by the operator, is received from the server system. The secret is unique for each installed trust card. On the basis of the secret of the server system, a PIN(check) is formed, which is compared with the real PIN code created at registration, for activating the state machine of the trust card. The real activation refers to the state of the internal state machine of the trust card, in which state the trust card can act independently directly with an external reader 67. First after a successful login, the real activation of the trust card is performed, when the operator's secret SS2 obtained in encrypted form from the server has been stored in the trust card 100 in the Java Card application 65 of the trusted zone 64.

For login, bidirectional authentication is applied, where both the server system and the Java Card are authenticated by means of their identifications and certificates exchanged at the registration step, as shown in FIG. 2. In this context, the Java Card 65 is used as a means for activating and deactivating the right to use the payment application 106. The identification of the server system is its web address with the certificate, and the identification used for the card is the unique identification created for it at the packetizing step before installation.

After this, the user moves the terminal to the vicinity of the external reader, having received information via the user interface about the successful activation of the trust card. The external reader 67 communicates with the Java Card 65 by means of APDU commands via the NFC module 66 according to the ISO/IEC 14443 standard, simultaneously transmitting the payment data, such as the sum total, from the merchant's reader to the user interface 63. The user interface application receives the payment data from the smart card by applying the APDU protocol by listening to events received in the payment application 106.

When the payment application 106 transmits a payment request to the server system 68, an automatic transaction checking module 73 checks the state of the card as well as the allowability of the sum to be paid with respect to the user's personal spending limits from the database 71 on the basis of the trust card ID. The personal spending limit, that is, the line of credit, can be checked both at the terminal and in the server system. The result, encrypted with a symmetric key, is returned to the smart card in the terminal. The result contains an encrypted APDU command which sets a PIN code in the APDU:Process primitive of the Java Card. After this, the payment is acknowledged; that is, the user's terminal is brought to the vicinity of the external reader again, which reads the checking result from a protected variable on the Java Card smart card by using APDU commands according to the ISO/IEC 14443 standard.

FIG. 7 shows another embodiment of an architecture possibly used in the system. In the example, the TEE used is a TrustZone platform, and the credential platform is Obc (On board Credential), which is based on technology of Nokia, used in platforms of Nokia smart phones, such as Windows Phone, Symbian and Meego. Said credential platform also meets well the requirements of the EMVCo specification. The word "credential" refers to a combination in which the program and the encrypted data need an encrypted storage and an encrypted bus or route for their mutual communication in the user's terminal. Other credential platforms include TEM, SKS, Flicker and TruWallet, which could also be well used as platforms for the payment system according to the invention, with modifications which are obvious for a person skilled in the art. The function of the credential platform is to manage the created credentials in the trusted zone and to release some encryption properties of the platform of the terminal for use by an application, the transparency of the properties being dependent on the level of reliability required by the application.

For its function, the Obc credential platform needs a defined trusted zone, which in this example is the TrustZone area based on ARM technology. In practice, this means that the TEE environment should comprise a defined area of the RAM memory, which can be used when an encrypted character string is released in the startup process of the terminal. This encrypted character string has been delivered and hardcoded to be terminal specific by the device manufacturer, and it cannot be changed or even read from the trusted zone functioning in the TEE area. In connection with the Obc credential platform, LUA scripting language is used in the trusted zone.

The Obc terminal 84 according to the system contains an Obc platform installed by the terminal manufacturer. In this embodiment, the terminal 84 is characterized in that the terminal 84 comprises an Obc Interpreter application 77 which is its core and is used for insulating the credentials from other possible credentials in the TEE area 86. The trust card 100 is installed inside the Obc Interpreter application 77 for insulating it. Furthermore, the terminal 84 comprises an Obc Provision Client 74 which represents the interface to be provided for the application, and an Obc Credential Manager 75 which is responsible for the connections of the applications with the TEE 86 and for managing the Obc database 78. This embodiment of the payment system is also characterized in that the terminal 84 is provided with a set of terminal-specific keys installed by its manufacturer, namely OPK (Obc Platform Key), an internal pair of keys (SK1, PK1) for the terminal, and an external pair of keys (SKe, PKe) for the terminal. These keys are used for encrypted and reliable communication with parties outside the trusted zone.

The payment application 106 to be downloaded by the user at the registration step comprises an Obc Provision Client program 74 for protected communication, as well as a user interface component 87 for communicating with the user.

The distribution and use of the sensitive application part and the secrets or credentials relating to it are typically started so that the Obc Provision Client application 74 in the user's terminal 84 sets up a connection with the management application 83 of the server system 85 of the operator or a trusted third party, that is, the provisioning server 85, thereby acting as means of the server system for communicating with the operating web server 82.

The Obc Provision Client application 74 transmits a general key certified by the device manufacturer to the provisioning server 85. The provisioning server 85 transmits a defined number of packets to the terminal 84. A provisioning packet may contain, for example, a program and encrypted data for an authentication process, as well as a necessary authorization which gives said program access to encrypted data. Using the Credential Manager 75, the Obc Provision Client application 74 creates a new credential, that is, enters the program and the encrypted data in the Obc system. In this way, the Obc Provision Client application 74 is thus used in this embodiment as means for activating and deactivating the right to use the payment application 106. The Obc Credential Manager 75 encrypts the packet transmitted from the provisioning server 85 by applying the Provision system application 76 and the private part of the terminal key, and encrypts the secret belonging to the credential by using a symmetric OPK (Obc Platform Key) identified for the terminal 84 and installed by the terminal manufacturer. Finally, the Credential Manager 75 stores the protected secret and the program in the Obc database 78.

In the embodiment of the payment system shown in FIG. 7, the payment transaction takes place primarily as shown in FIGS. 3 and 4. The difference to the embodiment shown in FIG. 6 lies in steps 23, 32 and 53 when the user has logged in the payment system, the terminal 84 is brought next to an external reader 81. Thus, the external reader 81 activates the active selected service name or server base station over the NFC module 80 of a P2P (peer-to-peer) protocol or R/W (read/write) NFC protocol, by using an intermediary application, that is middleware 79, created during the registration. In this context, the middleware 79 refers to the operator's application component which receives and transmits messages received from the NFC module 80 over an extension of the P2P protocol, i.e. LLCP protocol, after which it activates the necessary encrypted data and retrieves the user data and the user authentication from the trusted zone 86 by using the interface of the Credential Manager 75. Using and requesting the LLCP protocol takes place via application interfaces provided by the operator of the platform.

As an example, the external reader 81 transmits a payment request (150; eur; Feb. 12, 2011; stockmann tapiola) to the terminal 84 over the NFC. The middleware 79 receives the messages according to the LLCP protocol and transmits the received data to the payment application 106 acting in the trusted zone 86 and activated by the user via the interface 87. The payment application 106 checks if the value stored in the balance variable is sufficient for accepting the transaction. If the payment is accepted, the payment data are transmitted to the user's user interface UI 87 and further to the server system 85. The PIN code of the trust card has been entered in the system in advance, for example in steps 30 and 47 of FIGS. 3 and 4.

If the communicating party is a merchant's external reader or another device supporting the P2P protocol, the result of the checking of the PIN code or a single-use password is returned to it via the middleware. Alternatively, the acceptance of the payment can be transmitted in encrypted form to the external reader via the operator's server system over the Internet or a telephone network, if the received payment request also contains the information necessary for routing said external reader or other device, for encrypting a message denoting acceptance of the payment. The information can be, for example, an IP address or a telephone number, as well as the symmetric or public key of the external reader.

In the embodiment of the payment system according to FIG. 7, the middleware 79 and the Obc Provision Client application 74 are advantageously separate program codes, each performing its own task. The function of the Obc Provision Client application 74 is to take care of the communication of the terminal 84 with the server system 85 and to activate the right to use the payment application 106. The middleware, in turn, is responsible for the communication of the terminal with the NFC reader of the recipient of the payment. In this way, the middleware does not see the data received by the Obc Provision Client application, at least not in clear text, which increases the data security of the system.

We shall now present an example case of the use of NFC. The user has a mobile terminal supporting, for example, Nokia NFC technology, for example Nokia N9 or Nokia 701, and containing a trusted zone integrated and configured in the terminal. The trusted zone secures the sensitive data and application installed in it. In connection with the user registration, a trust card has been installed in the trusted zone. The trust card contains the operator's bank and account data, the customer's personal card number, and a secret key, a CA certificate, a trust card certificate (the certificate containing the identification of the trust card and the public key, as well as a signature written by the CA of the operator's server system), the total size being about 20 to 50 kbytes. The sizes of the single elements are: the CA≤2 kb, the secret key ≤2 kb, the public key/certificate ≤2 kb, the bank data <0.5 kb, and the application 15 to 30 kb.

Furthermore, the trust card contains a Java Cardlet application which is responsible for the management of APDU commands with the external reader and the creating and management of TLS/SSL connections with the server system. Furthermore, the Java Cardlet application is responsible for the processing of certificates and keys between the terminal and the server system.

NFC shopping takes place, for example, in the following steps:

1. The customer walks into a store, selects the items to be purchased in the normal way and then, at a suitable moment, starts the operator's application. The customer enters the user's secret SS1 in the application, whereby the trust card is authenticated in the trusted zone, and after the successful authentication the card is activated by the operator's server system using the secret SS2 of the server system. Furthermore, the result of the authentication is stored in the trust card. The communication protocol is full duplex over SSL/TLS GPRS, 3G or WLAN.

2. The customer enters the cashier queue with his/her shopping.

3. The cashier enters the sum of the shopping in an external reader equipped with an NFC chip.

4. The user brings the terminal close to the external reader, within a distance shorter than 10 cm, whereby the reader enters the data of the sales transaction by NFC/APDU communication in the user's terminal and retrieves the bank data from the user's terminal according to the NFC standards. The sum and the selection ACCEPT/REJECT are displayed to the user on the display of the terminal.

5. The user's terminal transmits the received data to the operator's server system (over TLS GPRS, 3G or WLAN), which stores the data of the payment transaction and retrieves the result (whether the sum was OK). The sum can already be stored on the trust card, in which case step 5 is not needed.

6. The user shows the terminal to the merchant's external reader again, which reads the acceptance/rejection. Furthermore, the external reader makes it own decision on the basis of an offline checking or by asking for verification from a credit company or the operator (the data are thus received by the reader in step 4), retrieves the ACCEPTED/REJECTED request to the terminal by applying the NFC/APDU, and prints out a receipt.

7. The user's terminal transmits the result (commit/rollback) received in step 6 to the server system. If the payment has already been made earlier in the operator's server system, step 7 is not necessary. Thus, the numerical variable representing the internal available spending balance of the trust card is updated over the NFC and APDU on the basis of the decision made by the external reader in step 6.

8. The merchant transmits a packet containing the data of the payment transaction to a bank or a credit company for settlement of the accounts.

Next, we will present the APDU commands given by the recipient of the payment, i.e. the merchant's external NFC reader, to the trust card of the user's terminal in connection with a payment transaction; in response, the external reader receives the values read from the trust card and the functions to be run. In step 24 of FIG. 3, the merchant's external reader transmits a command APDU:GET PROCESSING OPTIONS, asking for the following data which the trust card sends to the external reader:

Application Interchange Profile (which authentication forms are supported SDA (static data), DDA (dynamic data authentication)). For example, DDA is selected.

Application File Locator (which files and records are read from the trust card, for example, records belonging to offline data authentication)

In steps 24 and 25, the NFC reader transmits a request APDU:READ RECORD (Read application data), in which the following data are requested, which the trust card transmits to the external reader:

Application Identifier (AID) (trust card ID)
   Application Expiration Date (determined at the registration stage)
   Application effective date (determined at the registration stage)
Application Currency Code (currency)
Application Currency Exponent ( )
Application Primary Account Number
Application Primary Account Number (PAN) Sequence Number
Card Risk management object List 1 (the list of risk objects is received from the terminal by the trust card. The authentication is run in the trust card. For example, max limit, pin try counter)
Card Risk management object List 2
Cardholder Name
Cardholder Name Extended
Language Preference
CVM List (Card verification Rules: For example, "offline PIN"; "online transaction authentication").

At the same stage, the external reader also transmits a command APDU:GET DATA, by which it retrieves the data of the transaction.

In step 49 of a payment transaction without a network connection, Dynamic Data Authentication (offline data authentication—selected in the step of get processing option) is performed, whereby the user's terminal first transmits the public key/certificate of the trust card to the merchant's external reader, which authenticates the signature of the certificate from the CA certificate found in its own storage. Next, the external reader transmits random data to the user's terminal, the terminal signs the data with the private key of the trust card (ICC Private key) and transmits the signature of the data to the external reader. The terminal verifies the signature with the public key. The following items are checked:

ICC public key certificate (certificate of the trust card)
ICC public key reminder
ICC public key exponent
CA public key index
Issuer public key certificate
Issuer public key reminder
Issuer public key exponent In step 32 of FIG. 3, the external reader performs a Cardholder verification (offline PIN processing) function by transmitting a command APDU:VERIFY, in which the result "successful" or "not successful" of verifying the PIN code is requested from the trust card of the user's terminal. The result of checking the PIN code is obtained by comparing the PIN code formed at registration with the PIN(check) code formed during the payment transaction.

In step 34 of FIG. 3, the external reader performs the command APDU:GET DATA, by which is retrieves the reading of the counter of payment transactions from the terminal. Furthermore, in step 34, the external reader performs the command APDU:GENERATE AC (Transaction data to card—amount, date, time etc.), in which the external reader and the terminal agree on whether online or offline checking is used for checking, ARQC (online) or Transaction Certificate (offline—accepted) or AAC (offline—declined). If the trust card returns a Transaction certificate cryptogram to the external reader, the cryptogram is checked, and in the positive case, the offline transaction is accepted (AAC cryptogram rejected offline transaction). If the trust card returns the ARQC cryptogram formed with the key of the operator's server system (stored in the trusted zone) to the external reader, it is forwarded by the external reader to the server system, which checks and verifies the message with its own corresponding key. The server system returns the ARPC—Authorization Response Cryptogram back to the external reader and further to the trust card. The decision of accepting the transaction is made on the basis of these.

According to the EMV standard, the ARQC cryptogram can be formed by taking a MAC code from the data selected from the following set of values, for example according to the requirements of the trust card company:

| Value | Source |
|---|---|
| Amount, Authorised (Numeric) | Terminal |
| Amount, Other (Numeric) | Terminal |
| Terminal Country Code | Terminal |
| Terminal Verification Results | Terminal |
| Transaction Currency Code | Terminal |
| Transaction Date | Terminal |
| Transaction Type | Terminal |
| Unpredictable Number | Terminal |
| Application Interchange Profile | ICC |
| Application Transaction Counter | ICC |

Here, the source refers to whether the data is received from the merchant's terminal (terminal) or the card (ICC). Furthermore, the key used in forming the MAC code is a session key derived from a card-specific master key. In a corresponding manner, the card issuer verifies the cryptogram with a corresponding session key, for example by deriving it from the master key of the card, decides to accept or reject the transaction, and responds by computing ARPC=DES3(ARQC XOR ARC), by applying the same session key as in creating the ARQC cryptogram. Here, the ARC is the authorization response code by the card issuer (accepted, rejected, etc.).

TABLE 1a

|  | (registration phase over) | login | TZ value | | |
|---|---|---|---|---|---|
|  | 14 | 17 | 19 | 20 | 21 |
| SS1 | 1234 | 1234 | 1234 | 1234 | 1234 |
| SS2 | 6789 | 6789 | 6789 | 6789 | 6789 |
| PIN_ACTIVE | 12346789 | 12346789 | 12346789 | 12346789 | 12346789 |
| PIN_EFFECTIVE | −1 | 1234 | 1234 | 1234 | 1234 |
| TRUST_CARD_STATE | SUSPENDED | SUSPENDED | SUSPENDED | SUSPENDED | ACTIVE |
| PIN_RETRY_COUNTER | 3 | 3 | 2 | 3 |  |
| SYK2 | −1 | −1 | −1 | −1 | 10010101 |

TABLE 1a-continued

| | | | | | |
|---|---|---|---|---|---|
| Payment transaction(date/time, amount, currency, merchant, location . . . ) | −1 | −1 | −1 | −1 | −1 |
| Primary account number | 1111111-2222 | | | | |
| max pin retry value | 3 | 3 | 3 | 3 | 3 |
| Issuer key(key of original card issuer. If operator is issuer, key is generated with TZ) | 4.44444E+11 | 4.44444E+11 | 4.44444E+11 | 4.44444E+11 | 4.44444E+11 |
| card max limit | 200 | 200 | 200 | 200 | 200 |
| card expiry date | 1.1.2012 | 1.1.2012 | 1.1.2012 | 1.1.2012 | 1.1.2012 |

| | server | | | | |
|---|---|---|---|---|---|
| | 14 | 18 | 27 | 39 | 40 |
| H(SS1)(hash code from login pw entered by user) | −1 | 4132 | 4132 | 4132 | 4132 |
| user database:H(SS1) | 4132 | 4132 | 4132 | 4132 | 4132 |
| payment transaction | | −1 | 1.1.11; 100; eur; stockmann tapiola . . . | ROLLBACK(1.1.11; . . . ) | COMMIT(1.1.11) |

| | POI | |
|---|---|---|
| | 15 | 24 |
| Trust Card CVM (cardholder Verification method) list | −1 | off-line, online |
| Transaction amount | 20 | |
| Transaction details | | 1.1.11; 100; eur; stockmann tapiola . . . |

TABLE 1b

| | TZ value | | | | |
|---|---|---|---|---|---|
| | 26 | 28 | 30 | 35 | 38 |
| SS1 | 1234 | 1234 | 1234 | 1234 | 1234 |
| SS2 | 6789 | 6789 | 6789 | 6789 | 6789 |
| PIN_ACTIVE | 12346789 | 12346789 | 12346789 | 12346789 | 12346789 |
| PIN_EFFECTIVE | 1234 | 1234 | 12346789 | 12346789 | −1 |
| TRUST_CARD_STATE | ACTIVE | SUSPENDED | ACTIVE | SUSPENDED | SUSPENDED |
| PIN_RETRY_COUNTER | | | | | |
| SYK2 | 10010101 | −1 | 10010101 | 10010101 | −1 |
| Payment transaction(date/time, amount, currency, merchant, location . . . ) | 1.1.11; 100; eur; stockmann tapiola . . . | | | FAILED/SUCCEED( . . . ) | |
| Primary account number | | | | | |
| max pin retry value | 3 | 3 | 3 | 3 | 3 |
| Issuer key(key of original card issuer. If operator is issuer, key is generated with TZ) | 4.44444E+11 | 4.44444E+11 | 4.44444E+11 | 4.44444E+11 | 4.44444E+11 |
| card max limit | 200 | 200 | 200 | 200 | 200 |
| card expiry date | 1.1.2012 | 1.1.2012 | 1.1.2012 | 1.1.2012 | 1.1.2012 |

| | server | |
|---|---|---|
| | LOGOFF | |
| H(SS1)(hash code from login pw entered by user) | −1 | |
| user database:H(SS1) | 4132 | |
| payment transaction | ENCRYPT(data base.payment transaction) | |

TABLE 1b-continued

| POI | |
|---|---|
| | 33 |
| Trust Card CVM (cardholder Verification method) list | offline, PIN CHECK=OK, PIN retry limit<retry counter, Transaction amount<LIMIT |
| Transaction amount | |
| Transaction details | |

TABLE 2a

| | (registration step over) | login | | | |
|---|---|---|---|---|---|
| | | | TZ value | | |
| | 14 | 43 | 47 (at this stage, user can log off) | 52 | 56 |
| SS1 | 1234 | 1234 | 1234 | 1234 | 1234 |
| SS2 | 6789 | 6789 | 6789 | 6789 | 6789 |
| PIN_ACTIVE | 12346789 | 12346789 | 12346789 | 12346789 | 12346789 |
| PIN_EFFECTIVE | −1 | 1234 | 1234 | 12346789 | 12346789 |
| TRUST_CARD_STATE | SUSPENDED | SUSPENDED | ACTIVE | ACTIVE | ACTIVE |
| SYK3 | −1 | −1 | 2220020220 | −1 | −1 |
| Payment transaction(date/time, amount, currency, merchant, location . . . ) | −1 | −1 | −1 | −1 | 22.2011; 50; . . . |
| payment limit(balance available) | −1 | −1 | 200 | 200 | 150 |
| Card validity term | −1 | −1 | 24 h | 20 h | 20 h |
| Primary account number | 1111111-2222 | 1111111-2222 | 1111111-2222 | 1111111-2222 | 1111111-2222 |
| max pin retry value | 3 | 3 | 3 | 3 | 3 |
| Issuer key | 4.44444E+11 | 4.44444E+11 | 4.44444E+11 | 4.44444E+11 | 4.44444E+11 |
| card max limit | 200 | 200 | 200 | 200 | 200 |
| card expiry date | 1.1.2012 | 1.1.2012 | 1.1.2012 | 1.1.2012 | 1.1.2012 |

| | server | | | | |
|---|---|---|---|---|---|
| | 43 | 44 | 47 | 57 | 59 |
| H(SS1)(hash code from login pw entered by user) | −1 | 4132 | 4132 | −1 | |
| user database:H(SS1) | 4132 | 4132 | 4132 | 4132 | |
| payment transaction 1 | −1 | −1 | −1 | −1 | −1 |
| payment transaction 2 | −1 | −1 | −1 | −1 | −1 |

| | POI | |
|---|---|---|
| | 15 | 24 |
| Trust Card CVM (cardholder verification method) list | −1 | off-line, online |
| Transaction amount | 20 | |
| Transaction details | | 1.1.11; 100; eur; stockmann tapiola . . . |

TABLE 2b

| | TZ value | | | |
|---|---|---|---|---|
| | 59 | 60 | 61 | LOGOFF |
| SS1 | 1234 | 1234 | 1234 | 1234 |
| SS2 | 6789 | 6789 | 6789 | 6789 |
| PIN_ACTIVE | 12346789 | 12346789 | 12346789 | 12346789 |

TABLE 2b-continued

| | | | | |
|---|---|---|---|---|
| PIN_EFFECTIVE | −1 | 1234 | 1234 | −1 |
| TRUST_CARD_STATE | SUSPENDED | SUSPENDED | SUSPENDED | SUSPENDED |
| SYK3 | −1 | −1 | 333000330 | −1 |
| Payment transaction(date/time, amount, currency, merchant, location . . . ) | | [SEVERAL PAYMENT TRANSACTIONS] | | |
| payment limit(balance available) | 72 | 72 | 72 | 72 |
| Card validity term | 2 h | 2 h | 24 h | 24 h |
| Primary account number | 1111111-2222 | 1111111-2222 | 1111111-2222 | 1111111-2222 |
| max pin retry value | 3 | 3 | 3 | 3 |
| Issuer key | 4.44444E+11 | 4.44444E+11 | 4.44444E+11 | 4.44444E+11 |
| card max limit | 200 | 200 | 200 | 200 |
| card expiry date | 1.1.2012 | 1.1.2012 | 1.1.2012 | 1.1.2012 |

| server | |
|---|---|
| 61(possible logoff) | LOGOFF |

| | | |
|---|---|---|
| H(SS1)(hash code from login pw entered by user) | −1 | −1 |
| user database:H(SS1) | 4132 | 4132 |
| payment transaction 1 | 2.2.2011; 50; stockmann hel; . . . | 2.2.2011; 50; stockmann hel; . . . |
| payment transaction 2 | 3.2.2011; 78; K-rauta espoo; . . . | 3.2.2011; 78; K-rauta espoo; . . . |

| POI |
|---|
| 33 |

| | |
|---|---|
| Trust Card CVM (cardholder verification method) list | offline, PIN CHECK=OK, PIN retry limit<retry counter, Transaction amount<LIMIT |
| Transaction amount | |
| Transaction details | |

Some example embodiments will be described in the following.

Example 1

A Payment System for Producing Electronic and Secured Data to the Recipient of the Payment, the Payment System Comprising the user's terminal (62, 84) further comprising
a payment application (106) for setting up payment requests,
a trusted zone (64, 86) for storage and use of a programmed encryption element (100),
RFID connection means (66, 80) for supplying payment data to the terminal (67, 81) of the recipient of the payment,
means for communicating with the server system (63, 74) by applying a protected communications protocol, and
means (65, 74) relating to said encryption element (100) for activating and deactivating the right to use the payment application (106),
the operator's server system (68, 85), further comprising
a management application (70, 83) for authenticating and managing a terminal,
a database (71) for user specific data and keys, including the secret (SS2) of each payment application (106),
means (69, 82) for communicating with the terminal (62, 84) by applying a protected communications protocol,
the use of the payment application (106) is configured to comprise two steps, comprising the registration of the user in the server system (68, 85), and
the control of the validity of the payment application (106) by means of said access rights by applying an encryption element (100) and a secret (SS2) of the payment application (106) received from the server system (68, 85) at least at regular intervals.

Example 2

The payment system according to Example 1, characterized in that the terminal (62, 84) comprises a credit limit counter controlled by the encryption element (100).

Example 3

The payment system according to Example 2, characterized in that the RFID communication means (66, 80) of the terminal (62, 84) comprise an NFC module (80).

Example 4

The payment system according to one of the Examples 1 to 3, characterized in that in the terminal (62), the Java Card application is in said trusted zone (65) and the host application (63) authorized by it is in the unsecured zone, for setting up a user interface and a server connection.

Example 5

A payment system according to any of the Examples 1 to 3, characterized in that the terminal (84) comprises a trusted zone (86) implemented by ARM technology on the circuit level, comprising an Obc provision system application (76) and an Obc interpreter (77), and on the side of the unsecured zone an Obc Creditial Manager application (75), an Obc Provision Client application (74) and an Obc database (78), which are authorized.

Example 6

The payment system according to Example 5, characterized in that the encryption element (100) is implemented in the trusted zone (86) by means of LUA script language by using an Obc Interpreter (77).

Example 7

The payment system according to Example 5 or 6, characterized in that the terminal (84) comprises middleware (79) between the NFC module (80) and the Obc Credential Manager application.

Example 8

The payment system according to any of the Examples 1 to 7, characterized in that the control of the validity of the payment request at regular intervals is configured to take place at intervals of 2 to 48 h, advantageously in connection with every payment transaction.

Example 9

The payment system according to any of the Examples 1 to 8, characterized in that the server system (68, 85) is configured to perform an automatic transaction checking for every payment request.

Example 11

The payment system according to Example 10, characterized in that the secret (SS2) of the payment application (106) received from the server system (68, 85) is random.

Example 12

The payment system according to any of the Examples 1 to 11, characterized in that the encryption element (100) is configured to be installed dynamically and in an authorized manner from the operator's server system (68, 85) to the trusted zone (64, 86) of the user's terminal (62, 84) during the registration.

Example 13

The payment system according to Example 12, characterized in that the validity of the payment request is configured to be controlled by means of the PIN code of the payment application (106), which PIN code comprises in combination the secret (SS2) of the payment application (106) and the user's secret (SS1) to be created at the registration stage.

Example 14

The payment system according to any of the Examples 1 to 13, characterized in that the RFID means of the user's terminal (84) for communication with the server system (85) are separate from said means (74) for controlling the validity of the payment request.

Example 15

The payment system according to any of the Examples 1 to 14, characterized in that the trusted zone belonging to the terminal (84) and implemented on the circuit level is a prefabricated SoC circuit connected to the terminal.

Example 16

The payment system according to any of the Examples 1 to 15, characterized in that the payment system further comprises the terminal (81) of the recipient of the payment, equipped with RFID means for transmission of payment data.

On the basis of the description above, it is clear for a person skilled in the art that different embodiments of the invention can be implemented with data processing devices, such as servers and user terminals as well as point-of-sale terminals. These devices may comprise a computer program code for running the methods according to the invention, and such a computer program code can be formed, according to prior art, to a computer software product which provides devices to perform methods, when the code of the computer software product is run in a processor.

The invention is not limited the examples of the above description, or combinations thereof, which can be implemented by a person skilled in the art, but the scope of the invention is defined by the appended claims.

The invention claimed is:

1. A method for performing a payment transaction in a secure manner, the method comprising:
   receiving, in a user's terminal, a secret of a payment application executing in the user's terminal, from an operator's server system, said secret having been stored in a memory at said operator's server system and sent from the operator's server system to the user's terminal responsive to an activation of the payment application by the user's terminal,
   activating a trust card of the payment application, the trust card being stored in a safe memory area in said user's terminal, the trust card being activated by the storing of said secret of the payment application in the safe memory area said secret of the payment application being required to activate said trust card,
   receiving payment data for the payment transaction in the user's terminal, the payment data sent from a point-of-sale terminal to the user's terminal over a local communication connection,
   encrypting in the user's terminal said payment data to obtain encrypted payment data,
   transmitting said encrypted payment data over a wide area network from said user's terminal to the operator's server system, wherein the operator's server system is configured to check said payment transaction,
   in response to said transmitting, receiving, in the user's terminal, a second secret from said operator's server system over the wide area network if said checking produced an acceptable result, said second secret relating to said trust card and being configured to be used by the point-of sale terminal for performing said payment transaction, and
   transmitting over said local communication connection, data of the trust card and said second secret, from said user's terminal to said point-of-sale terminal, wherein the point-of-sale terminal is configured to use the data of the trust card and said second secret to perform said payment transaction by the point-of-sale terminal.

2. The method according to claim 1, wherein the secret of the payment application has a validity term, during which it can be used in an authorized manner for activating the trust card.

3. The method according to claim 2, comprising:
applying said trust card to form a cryptogram for verifying the payment transaction, said cryptogram being derived from said payment data and sent to the point-of-sale terminal.

4. The method according to claim 1, wherein said second secret is an ARQC cryptogram and the second secret is sent to the point-of-sale terminal.

5. The method according to claim 1, comprising:
receiving a user's secret from the user,
forming a code from the user's secret and said secret of the payment application received from the server system, and
applying said code for performing said payment transaction.

6. The method according to claim 1, wherein said payment data is encrypted using said secret of the payment application.

7. A method for making a payment transaction in a secure manner, the method comprising:
forming a secret in a server system for a payment application executing in a user's terminal, said secret for performing said payment transaction,
receiving, by the server system over a wide area network, a user's secret from the user's terminal for authenticating said user,
authenticating said user by the server system,
in response to a successful authentication by the server system, encrypting said secret of the payment application,
making said secret of the payment application available for use by the user's terminal;
activating a trust card of the payment application, the trust card being stored in a safe memory area in said user's terminal, by storing said secret of the payment application in the safe memory area, said secret of the payment application being required to activate said trust card,
receiving payment data for the payment transaction in the user's terminal, the payment data sent from a point-of-sale terminal to the user's terminal over a local communication connection,
encrypting in the users terminal said payment data to obtain encrypted payment data,
transmitting said encrypted payment data over a wide area network from said user's terminal to the operator's server system, wherein the operators server system is configured to check said payment transaction,
in response to said transmitting, receiving, in the user's terminal, a second secret from said operator's server system over the wide area network if said checking produced an acceptable result, said second secret relating to said trust card and being configured to be used by the point-of sale terminal for performing said payment transaction,
transmitting over said local communication connection, data of the trust card and said second secret, from said user's terminal to said point-of-sale terminal, wherein the point-of-sale terminal is configured to use the data of the trust card and said second secret to perform said payment transaction.

8. The method according to claim 7, comprising:
receiving user data from the user for forming the user's secret, and
forming said user's secret on the basis of said user data.

9. The method according to claim 7, wherein said trust card is created and personalized on the server system for every payment event.

10. The method according to claim 7, wherein the state of the trust card is maintained at the server system on the basis of the payment transactions made.

11. A system for making a payment transaction, said system comprising at least one processor, a memory and a computer program code in said memory, the computer program code being configured, when run in said at least one processor, to cause the system to:
receive, in a user's terminal, a secret of a payment application executing in the user's terminal, from an operators server system, said secret having been stored in a memory at said operator's server system and sent from the operator's server system to the user's terminal responsive to an activation of the payment application by the user's terminal,
activate a trust card of the payment application, the trust card being stored in a safe memory area in said user's terminal, the trust card being activated by the storing of said secret of the payment application in the safe memory area said secret of the payment application being required to activate said trust card,
receive payment data for the payment transaction in the user's terminal, the payment data sent from a point-of-sale terminal to the user's terminal over a local communication connection,
encrypt in the user's terminal said payment data to obtain encrypted payment data,
transmit said encrypted payment data over a wide area network from said user's terminal to the operator's server system, wherein the operators server system is configured to check said payment transaction,
in response to said transmitting, receive, in the user's terminal, a second secret from said operator's server system over the wide area network if said checking produced an acceptable result, said second secret relating to said trust card and being configured to be used by the point-of sale terminal for performing said payment transaction, and
transmit over said local communication connection, data of the trust card and said second secret, from said user's terminal to said point-of-sale terminal, wherein the point-of-sale terminal is configured to use the data of the trust card and said second secret to perform said payment transaction.

12. The device according to claim 11, comprising computer program code being configured, when run in said at least one processor, to cause the user's terminal:
to receive a user's secret from a user,
to form a code from the user's secret and said secret of the payment application received from the operator's server system, and
to apply said code for performing said payment transaction.

13. A system for making a payment transaction, the system comprising a server system and a user terminal, the server system comprising at least one processor, a memory and a computer program code in said memory, the computer program code being configured, when run in said at least one processor, to cause the server system to:

form a secret in the server system for a payment application executing in the user terminal, said secret for performing said payment transaction,
receive a user's secret over a wide area network from the users terminal for authenticating said user,
authenticate said user using the user's secret,
encrypt said secret of the payment application in response to a successful authentication of said user, and
make said secret of the payment application available for use by the users terminal; wherein the user terminal is configured to:
activate a trust card of the payment application, the trust card being stored in a safe memory area in said user's terminal, by storing said secret of the payment application in the safe memory area, said secret of the payment application being required to activate said trust card,
receive payment data for the payment transaction, the payment data sent from a point-of-sale terminal to the user's terminal over a local communication connection,
encrypt said payment data to obtain encrypted payment data,
transmit said encrypted payment data over a wide area network from said user's terminal to the operator's server system, wherein the operator's server system is configured to check said payment transaction,
in response to said transmitting, receive, in the users terminal, a second secret from said operator's server system over the wide area network if said checking produced an acceptable result, said second secret relating to said trust card and being configured to be used by the point-of sale terminal for performing said payment transaction, and
transmit over said local communication connection, data of the trust card and said second secret, from said user's terminal to said point-of-sale terminal, wherein the point-of-sale terminal is configured to use the data of the trust card and said second secret to perform said payment transaction.

14. The server system according to claim 13, comprising computer program code being configured, when run in said at least one processor, to make the system:
to receive payment data of said payment transaction from the user's terminal for checking, and
to make a second secret, formed by and stored in a memory of the server system, available for use by the user's terminal, if said checking produces an accepted result, said second secret being configured to be used for performing the payment transaction.

15. The system according to claim 13, comprising computer program code being configured, when run in said at least one processor, to make the server system:
to form said secret of the payment application and the user's secret,
to form a code from said user's secret and said secret of the payment application, and
to configure a trust card stored in a memory of the server system to be supplied to the user's terminal to be activated with said code for performing the payment transaction.

16. The server system according to claim 13, comprising computer program code being configured, when run in said at least one processor, to make the server system:
to receive data from the user for forming the user's secret, and
to form said user's secret on the basis of said data.

17. A non-transitory computer program product for making a payment, the computer program product comprising a computer software code stored on a non-volatile computer-readable medium, the computer program code, when run in at least one processor, causing a user's terminal to:
receive, a secret of a payment application executing in the user's terminal, from an operator's server system, said secret having been stored in a memory at said operator's server system and sent from the operator's server system to the user's terminal responsive to an activation of the payment application by the users terminal,
activate a trust card of the payment application, the trust card being stored in a safe memory area in said user's terminal, the trust card being activated by the storing of said secret of the payment application in the safe memory area said secret of the payment application being required to activate said trust card,
receive payment data for the payment transaction in the user's terminal, the payment data sent from a point-of-sale terminal to the user's terminal over a local communication connection,
encrypt in the user's terminal said payment data to obtain encrypted payment data,
transmit said encrypted payment data over a wide area network from said user's terminal to the operator's server system, wherein the operators server system is configured to check said payment transaction,
in response to said transmitting, receive, in the user's terminal, a second secret from said operator's server system over the wide area network if said checking produced an acceptable result, said second secret relating to said trust card and being configured to be used by the point-of sale terminal for performing said payment transaction, and
transmit over said local communication connection, data of the trust card and said second secret, from said user's terminal to said point-of-sale terminal, wherein the point-of-sale terminal is configured to use the data of the trust card and said second secret to perform said payment transaction.

* * * * *